United States Patent [19]

Limcaco

[11] Patent Number: 5,755,961

[45] Date of Patent: *May 26, 1998

[54] AQUARIUM SYSTEM

[76] Inventor: Christopher A. Limcaco, 30 Crickwood La., Mooresville, Ind. 46158

[*] Notice: The term of this patent shall not extend beyond the expiration date of Pat. No. 5,647,983.

[21] Appl. No.: 766,150

[22] Filed: Dec. 12, 1996

Related U.S. Application Data

[62] Division of Ser. No. 552,915, Nov. 3, 1995, Pat. No. 5,647,983.

[51] Int. Cl.$^6$ .................. C02F 3/02; C02F 3/08
[52] U.S. Cl. .............. 210/416.2; 210/150; 210/151; 210/169; 119/260; 119/261; 119/266; 415/88
[58] Field of Search .................. 210/150, 151, 210/416.2, 169, 619, 259; 299/3; 119/260, 261, 266, 227, 76; 366/262; 415/88; 417/425, 572

[56] References Cited

U.S. PATENT DOCUMENTS

| | | | |
|---|---|---|---|
| 2,877,051 | 3/1959 | Cushman et al. | 299/3 |
| 3,540,589 | 11/1970 | Boris | 210/150 |
| 4,028,244 | 6/1977 | Holmberg | 210/150 |
| 4,043,299 | 8/1977 | Birkbeck et al. | 119/3 |
| 4,093,539 | 6/1978 | Guarino | 210/150 |
| 4,160,736 | 7/1979 | Prosser | 210/150 |
| 4,200,532 | 4/1980 | Iwatani et al. | 210/151 |
| 4,333,893 | 6/1982 | Clyde | 261/94 |
| 4,468,326 | 8/1984 | Kawert | 210/169 |
| 4,606,821 | 8/1986 | D'Imperio | 210/169 |
| 4,668,387 | 5/1987 | Davie et al. | 210/150 |
| 4,737,278 | 4/1988 | Miller | 210/150 |
| 4,761,227 | 8/1988 | Willinger et al. | 210/169 |
| 4,867,874 | 9/1989 | Aubert et al. | 210/169 |
| 4,995,980 | 2/1991 | Jaubert | 210/602 |
| 5,006,230 | 4/1991 | Votava, III et al. | 210/94 |
| 5,078,867 | 1/1992 | Danner | 210/169 |
| 5,096,576 | 3/1992 | Szabo | 210/150 |
| 5,227,055 | 7/1993 | Timmons | 210/151 |
| 5,234,581 | 8/1993 | Rosenberg | 210/151 |
| 5,246,854 | 9/1993 | O'Brien et al. | 435/285 |
| 5,269,914 | 12/1993 | Englert | 210/151 |
| 5,326,459 | 7/1994 | Hlavach et al. | 210/150 |
| 5,350,507 | 9/1994 | McManus | 210/150 |
| 5,419,831 | 5/1995 | Fuerst et al. | 210/151 |
| 5,423,978 | 6/1995 | Snyder et al. | 210/151 |
| 5,466,373 | 11/1995 | Handwerker et al. | 210/602 |

OTHER PUBLICATIONS

Control of the Biochemical Environment, Filters, Bacteria, and the Algal Turf Scurbber; Dynamic Aquaria, Building Living Ecosystems; Adey, Loveland, pp. 221–247.

Great Barrier Reef Mesocosm; Dynamic Aquaria, Building Living Ecosystems; Adey, Loveland, pp. 531–539.

*The Reef Aquarium, A Comprehensive Guide to the Identification and Care of Tropical Marine Invertebrates;* Delbeek, Sprung; vol. 1, pp. 106–109.

*The Reef Aquarium, A Comprehensive Guide to the Identification and Care of Tropical Marine Invertebrates;* Delbeek, Sprung; vol. 1, pp. 142–156.

Design of Facilities for the Biological Treatment of Wastewater; Wastewater Engineering, Treatment, Disposal and Reuse; Tchobanoglous, Burton; Third Edition, pp. 628–636.

*Primary Examiner*—Cynthia L. Nessler
*Attorney, Agent, or Firm*—Beck, Michael & Beck, P.C.

[57] ABSTRACT

An aquarium system includes an inlet reservoir, an aquarium tank defining a container for water in fluid communication with the inlet reservoir to receive water displaced from the inlet reservoir, an outlet reservoir in fluid communication with the tank for receiving water displaced from the tank, and a water treatment unit in fluid communication with the inlet reservoir and the outlet reservoir. The water treatment unit includes a rotatably supported media wheel which has a first hollow portion and a second portion carrying a water displacement media. The media is alternately submersible into and raisable out of water contained in the water treatment unit as the media wheel is rotated to displace water from the unit to the inlet reservoir, to thereby cycle water through the system. In one embodiment, the displacement media is a biological media. In another embodiment, the media wheel carries an algae screen on its perimeter.

17 Claims, 6 Drawing Sheets

AQUARIUM SYSTEM

This application is a division of application Ser. No. 08/552.915, filed Nov. 3, 1995, now U.S. Pat. No. 5,647, 983.

FIELD OF THE INVENTION

The present invention relates to water treatment devices and systems. More particularly, this invention concerns aquarium water treatment systems which model natural, healthy ecosystems.

BACKGROUND OF THE INVENTION

Aquarium enthusiasts have searched for the perfect water treatment system that will model a natural ecosystem. Water movement, oxygen and pH control, nutrient control and waste removal are essential for a healthy, captive water ecosystem. The system must support algae, aerobic bacteria, plankton and coral growth to satisfy these requirements.

Water movement facilitates the exchange of metabolites and mimics ocean tides which rise and fall over algae covered rocks. Algae, which is required for a healthy captive ecosystem, requires water movement. Several approaches have been used to mimic natural water movement. Lee Chin Eng circulated unfiltered sea water with air bubbles in his "nature's system" to model the wave action of nature ecosystems. Wave generators have been used to create water movement but unfortunately these devices can cause splashing which upsets the salt concentration of the water. Several references disclose systems which rely partially on equilibrium or gravity for water movement. Most contemplate the use of a water pump which is disadvantageous due to plankton mortality. Plankton is required to support coral and filter feeding organisms. (See U.S. Pat. Nos. 5,419,831 to Fuerst et al.; 4,867,874 to Aubert et al.; 4,606,821 to D'Imperio; 5,096,576 to Szabo and 4,761,227 to Willinger et al.). Some references use an air pump to induce water flow and introduce oxygen. (See U.S. Pat. Nos. 5,234,581 to Rosenberg and 5,269,914 to Englert). Unfortunately, many of these devices also cause splashing.

Various methods and devices have been developed for controlling oxygen concentration, pH, nutrient availability and waste control. The most natural approaches have used biological filters or algae turf scrubbers. Biological filtration systems provide attachment surfaces for microorgansisms to increase biological and chemical activities.

Trickle filters are available for biological filtration. In such devices, water is typically removed from the aquarium and allowed to trickle over a bed of lava rock or plastic balls. Trickle filters provide an oxygen rich environment for the growth of aerobic bacteria because the bed is not submerged. However, trickle filters can take up a relatively large area and usually require dedicated plumbing and pump fixtures. As a result, such filters can be expensive and impractical in most applications and are not particularly useful for the average home aquarium.

Rotating biological filters are often used to support bacterial growth in home aquariums. These filter systems are partially submerged so that each portion of the media is alternately submerged and exposed to air. See U.S. Pat. No. 5,419,831 to Fuerst which discloses that the filter is rotated with a stream of water. One disadvantage of this device is that it requires a water pump. Bacterial filters are further limited because while they remove ammonia and particulate waste, they deplete oxygen and increase the concentration of nitrates and carbon dioxide.

Algae turf scrubbers address some of the limitations of biological filters in that they control oxygen concentration, pH and nutrient availability. Dr. Adey's system includes a shallow trough in fluid communication with an aquarium tank. A mesh screen in the trough supports algae growth and a wave surge bucket provides water movement. Because algae is most efficient when young, the algae must be harvested or scraped from the screen periodically. Harvesting simulates the grazing that occurs in natural systems. One disadvantage of this system, however, is that harvesting must be done manually which is labor intensive. Also, the centrifugal pumps required for these systems kill plankton and the splashing disrupts the salt concentration of the water. Furthermore, these systems require significant modifications to existing aquariums.

A need has remained for devices which connect easily to existing aquariums and support natural-type ecosystems by controlling pH, oxygen, carbon dioxide concentration, nutrient availability and waste removal without the disadvantages of splashing, killing plankton and extensive maintenance.

SUMMARY OF THE INVENTION

In accordance with the invention, devices and systems for treating aquarium water are provided. In one aspect, the invention includes: an inlet reservoir, an aquarium tank defining a container for water in fluid communication with the inlet reservoir to receive water displaced from the inlet reservoir, an outlet reservoir in fluid communication with the tank for receiving water displaced from the tank, a water treatment unit in fluid communication with the inlet reservoir and the outlet reservoir. The water treatment unit includes a rotatably supported media wheel which has a first hollow portion and a second portion carrying a water displacement media. The media is alternately submersible into and raisable out of water contained in the water treatment unit as the media wheel is rotated to displace water from the unit to the inlet reservoir, to thereby cycle water through the system.

In one specific embodiment, the water displacement media includes a biological filter media for supporting bacterial growth. In another specific embodiment, the invention also includes a screen attached to at least a part of the media wheel for supporting algal growth. In some embodiments of the invention, a plurality of air capture members are provided which are operatively associated with the media wheel and are configured to capture air from an air pump. In other specific embodiments, the air capture members are attached to the perimeter of one or more air capture wheels, which shares a common axle with the media wheel. As the air capture members capture air from the air pump, the air capture wheel and the media wheel rotate.

One object of the present invention is to provide devices which attach easily to existing aquariums and support natural-type ecosystems by controlling pH, oxygen, carbon dioxide concentration, nutrient availability and waste removal without the disadvantages of splashing, killing plankton and extensive maintenance.

One benefit of the present invention is that it combines algae treatment, biological filtration, water movement, wave creation and oxygenation in one unit without the requirement for a water pump. Another benefit of the current invention is that it is easily adapted to existing aquariums, requiring only installation of lines between the aquarium and the treatment tank.

Still another benefit of this invention is that it is configured so that algae and bacteria are in close proximity to one

3 another, allowing for more efficient and quicker gas exchange. Other objects and further benefits of the present invention will become apparent to persons of ordinary skill in the art from the following written description and accompanying figures.

DESCRIPTION OF THE PREFERRED EMBODIMENTS

Figure 1:
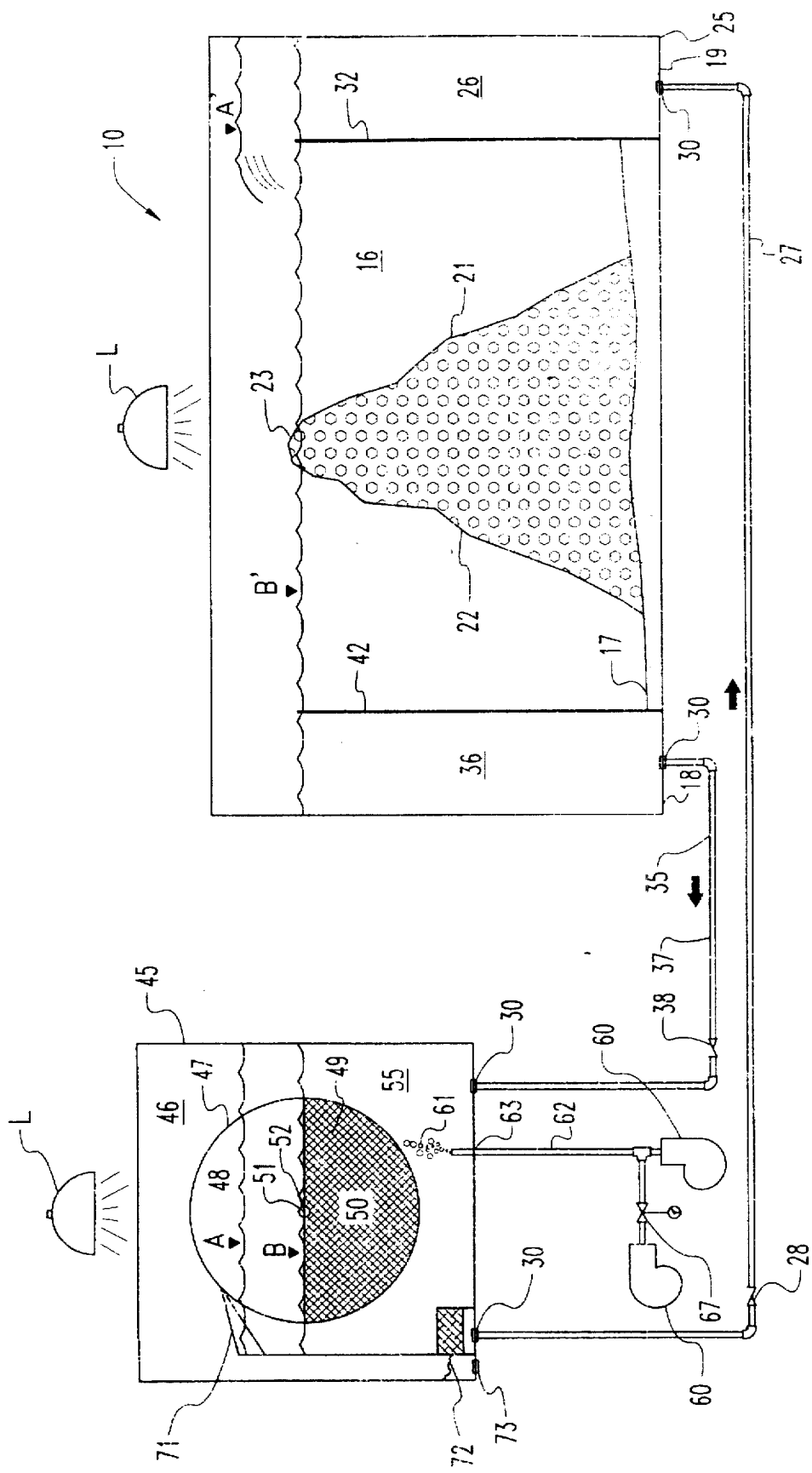
FIG. 1 is a side elevational view of an aquarium system according to one embodiment of this invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

The present invention provides devices and systems which support natural-type ecosystems by controlling pH, oxygen, carbon dioxide concentration, nutrient availability and waste removal. An air pump provides wave generation and fluid movement. This invention combines algae treatment, biological filtration, water movement, wave creation and oxygenation in one unit without the requirement for a water pump. The treatment devices of this invention attach easily to existing aquariums without significant modifications.

Generally, the fluid treatment devices and systems of this invention include a rotatably supported media wheel which has a first hollow portion and a second portion carrying a displacement media. The displacement media is alternately submersed into and raised out of fluid contained in a fluid treatment unit as the media wheel is rotated to displace fluid from the unit. When the displacement media is forced into the fluid, the fluid level will rise due to the fluid displaced by the volume of the displacement media. This causes fluid to flow from the treatment unit to the aquarium tank. The fluid levels in both tanks will then equilibrate at a higher level. When the displacement media is moved out of the fluid, the fluid level in the treatment unit will drop and the higher fluid level in the aquarium will cause fluid to flow back to the treatment unit. The continued displacement of fluid by submersing and raising the displacement media causes a continuous movement of fluid through the system.

In accordance with one embodiment of the invention, an aquarium system 10 is depicted in FIG. 1. The aquarium system depicted in FIG. 1 generally includes an aquarium tank 15, an inlet reservoir 25, an outlet reservoir 35 and a water treatment unit 45. The aquarium tank 15 defines a container for water 16 which is in fluid communication with the inlet reservoir 25. The inlet reservoir 25 includes an inflow box or inlet container 26, a first water line 27 or inlet conduit and a check valve 28. The water line 27 is attached to the inflow box 26 and the treatment unit 45 with appropriate fixtures 30. The first check flow valve 28 does not allow water to flow towards the treatment unit.

The inlet reservoir 25 also includes wave wall 32. Wave wall 32 is configured so that water displaced from the inlet container flows over into the aquarium tank 15. Preferably, the inlet and outlet conduits 27, 37 are placed on opposite ends 18, 19 of the aquarium tank 16 to ensure that the flow goes from one end of the tank 16 to the other.

The aquarium tank 16 preferably includes coral sand 17 and live rock 20 which defines a forward reef 21, a back reef 22 and a crest 23 as shown in FIG. 1. Live rock is understood in the art to include any type of rock material which includes living organisms. Any suitable live rock is contemplated including but not limited to natural and cultured reef and synthetic materials. Preferably, the live rock will be composed of old coral skeletons and shells encrusted with plants such as coralline algae. The live rock will preferably also include a variety of living organisms such as worms, crustaceans, clams, sponges, algae, nitrifying and dentrifying bacteria and heterotrophic bacteria.

Outlet reservoir 35 preferably includes an outlet container 36, a second water line 37 or outlet conduit and an overflow wall 42. The overflow wall 42 is preferably positionable between the outlet container 36 and the aquarium tank 16. The overflow wall 42 is configured so that water displaced from the aquarium tank 16 flows over into the outlet container 36. The second water line 37 is in fluid communication with the treatment unit 45 and the outlet container 36. The outlet conduit 37 includes a second check valve 38 which is configured to prevent fluid flow towards the outlet container.

The treatment unit 45 defines a tank for holding water 46 and a fluid movement device. In one embodiment, the fluid movement device includes a media wheel 47 rotatably supported in the treatment unit 45. The treatment unit preferably includes a plexiglass tank 46. The media wheel 47 includes a first hollow portion 48 and a second portion 49 carrying a water displacement media 50. The media wheel 47 is rotatably supported by any appropriate means. For example, the media wheel 47 can be suspended by an axle 51 threaded through a bore 52 drilled into the center of the media wheel 47. The media 50 is alternately submersible into and raisable out of water or fluid 55 contained in the water treatment unit 45 as the media wheel 47 is rotated to displace water from the unit 45 to the inlet reservoir 25 to thereby cycle water through the system 10.

The invention also contemplates means for rotating the media wheel 47. Preferably, the means for rotating the media wheel 47 includes an air pump 60 which delivers air 61 to the treatment unit 45 through an air tube 62 which is introduced into the treatment tank 46 through an air tube aperture 63 defined in the tank 46. Preferably, the system includes an air flow control valve 74 which most preferably includes a timer for automatic flow variation. Timers of this sort are well known in the art and can be easily installed on the control valve 74 of the air pump 60.

Figure 2:
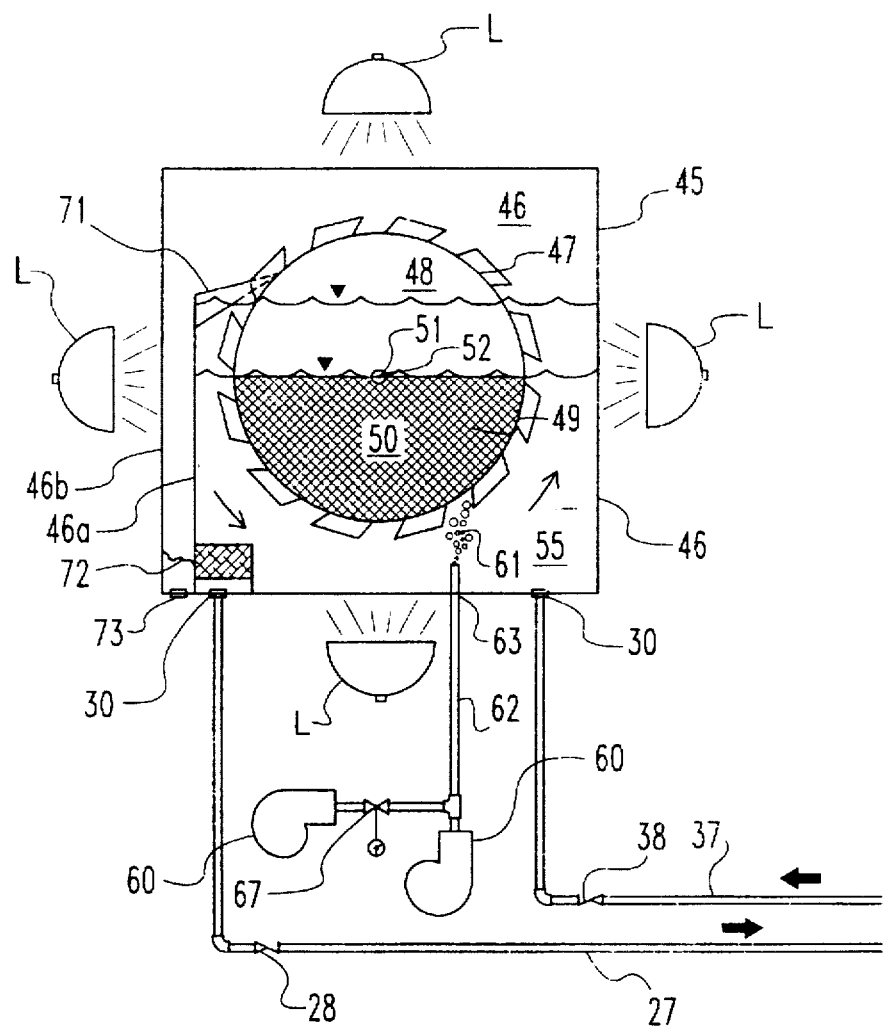
FIG. 2 is a side elevational view of one embodiment of a treatment unit according to this invention.
Figure 3:
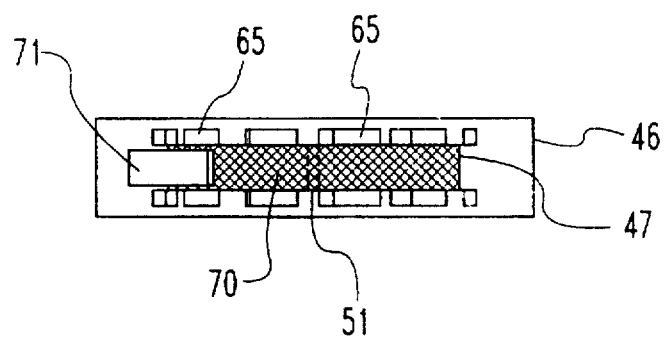
FIG. 3 is a top elevational view of the treatment unit depicted in FIG. 2.

As shown in FIGS. 2 and 3, one preferred embodiment of this invention includes a plurality of air capture members 65 operatively associated with the media wheel 47. The air capture members 65 are configured to capture air 61 from the air pump 60 to rotate the media wheel 47 and move water through the system as the media 50 is alternately submerged into and raised out of the water. In one embodiment, the air capture members 65 are attached to an outer perimeter 66 of the media wheel 47.

Now referring to FIGS. 1–3, the operation of a system according to this invention will be described. Air 61 is introduced into the air capture members 65 which can be plastic cup-like members attached to the perimeter 66 of the media wheel 47. Capture of air 61 by air capture members 65 causes the air capture members 65 to rise which in turn causes the media wheel 47 to rotate either clockwise or counterclockwise depending on the configuration of the air capture members 65 and the air tube 62. The rotation of the media wheel 47 alternately moves the displacement media 50 into and out of the fluid.

When the displacement media 50 is forced into the fluid 55, the fluid level in the treatment unit will rise to level A due to the fluid displaced by the volume of the displacement media 50. This will in turn cause fluid to flow from the treatment unit 45 to the aquarium 15. The fluid displaced from the treatment unit 45 will flow into the inlet conduit 27 and into the inlet container 26. The first check valve 28 prevents fluid flow from the inlet container and inlet conduit back into the treatment tank 46. Fluid from the inlet container 26 will overflow the wave wall 32 as the fluid reaches the level A'. When the displacement media 50 is forced out of the fluid, the fluid level in the treatment unit will drop to level B and the higher level A' in the aquarium will cause fluid to flow back to the treatment unit 45. Fluid in the aquarium tank 16 overflows the overflow wall 42 into the outlet container 36 through the outlet conduit 37 and into the treatment tank 46. The second check valve 38 prevents flow back into the outlet container 36. The continued displacement of fluid by submersing and raising the displacement media 50 causes a continuous movement of fluid through the system.

Preferably, the displacement media 50 includes a biological filter media for supporting bacterial growth. The biological filter media may be any media which is suitable for supporting bacterial growth, including solid, semi-solid and liquid media. Most preferred is plastic bacterial media. Any suitable plastic material which will support aerobic bacterial growth is contemplated, such as polyethylene. Aerobic bacteria contribute to the health of a natural-type captive ecosystem by removing ammonia and particulate waste. This invention provides advantages over other rotating biological filters in that a water pump is not required and the bacterial filter media also moves water through the system. The movement of the filter media in and out of the water combined with the air from the air pumps will provide a good gas transfer between the bacteria attached to the media and the water.

The media wheels 47 of the present invention also preferably include an algae screen 70 attached to at least a portion of the media wheel 47 for supporting algal growth. The use of algae in aquarium systems in beneficial for controlling oxygen concentration, pH and nutrient availability. One or more lights, preferably metal halide lights L may be provided to illuminate the media wheel 47 to encourage algal growth.

Preferably the system also includes an algae scraper 71 which is used to harvest the algae. In the embodiment shown in FIG. 2, the algae scraper 71 is attached to a scraper support wall 46a. Algae scraper 71 is preferably aligned to contact a portion of the algae screen 70 to continuously scrape algae from the screen as the media wheel 47 is rotated. A harvested algae zone 72 is also preferably provided. In the embodiment shown in FIG. 2, the harvested algae zone 72 is defined by the scraper support wall 46A and an outer wall 46B of the treatment tank 46.

The present invention provides an advantage in that algae harvesting is done automatically and it is not required to be done manually. The present invention also provides a further advantage because the algae screen 70 is attached to the perimeter 66 of the media wheel 47 which is rotated into and out of the water. The movement of the screen 70 in and out of the water when combined with the high intensity metal halide lights L makes the perimeter 66 of the media wheel 47 a natural environment for the growth of algae. The constant submergence and removal of the algae from the water provides for good gas exchange between the algae, water and air and provides the varying intensity of light on the algae. This action resembles a natural system where ocean tides rise and fall over algae covered rocks. Furthermore, the algae and bacteria are in close proximity to one another allowing for more efficient and quicker gas exchange between the two. This is in contrast to most aquarium water systems which do not include both algae and bacterial treatments and which separate biological treatment from other forms of treatment.

Figure 4:
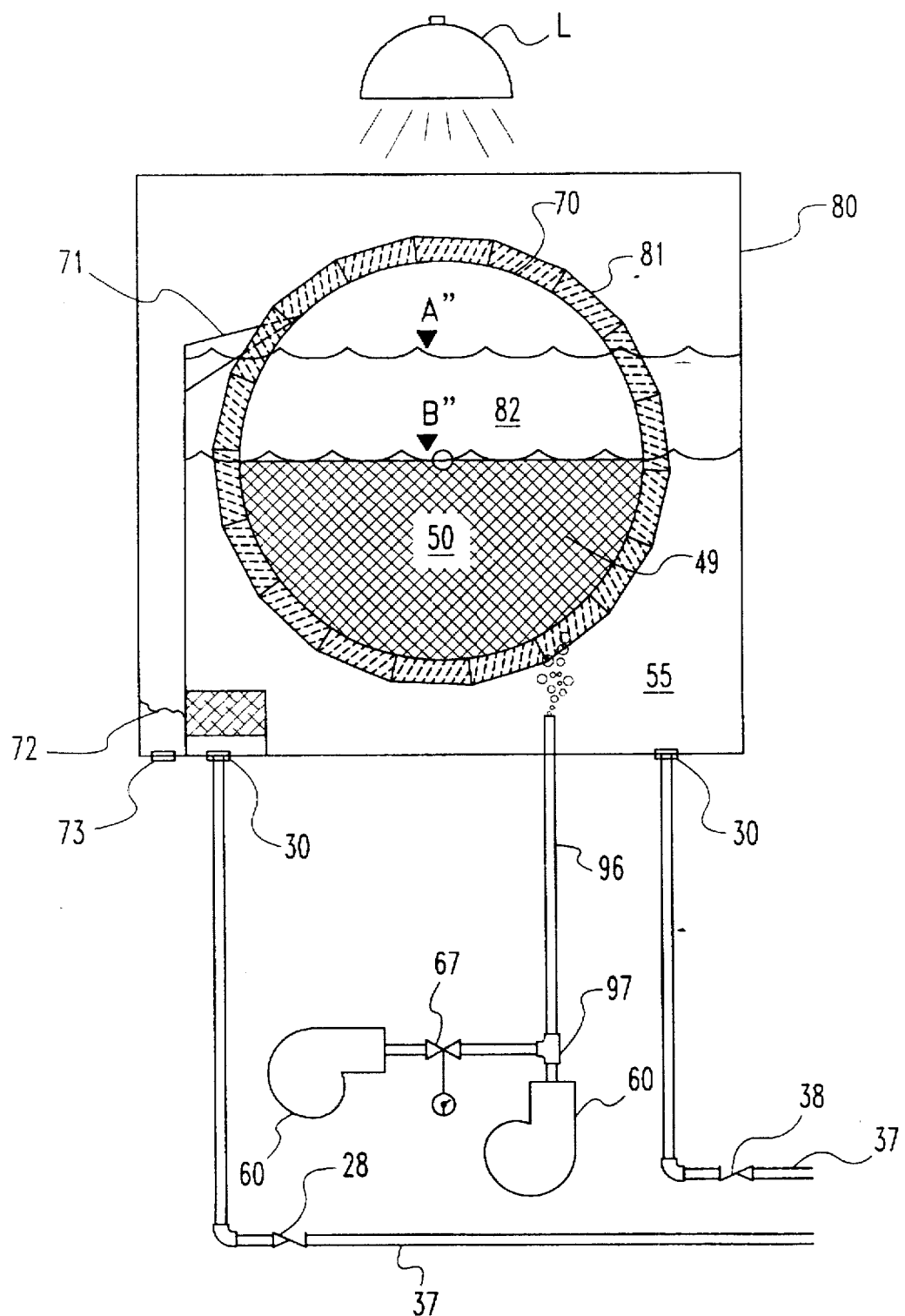
FIG. 4 is a side elevational view of another embodiment of a treatment unit according to this invention.
Figure 5:
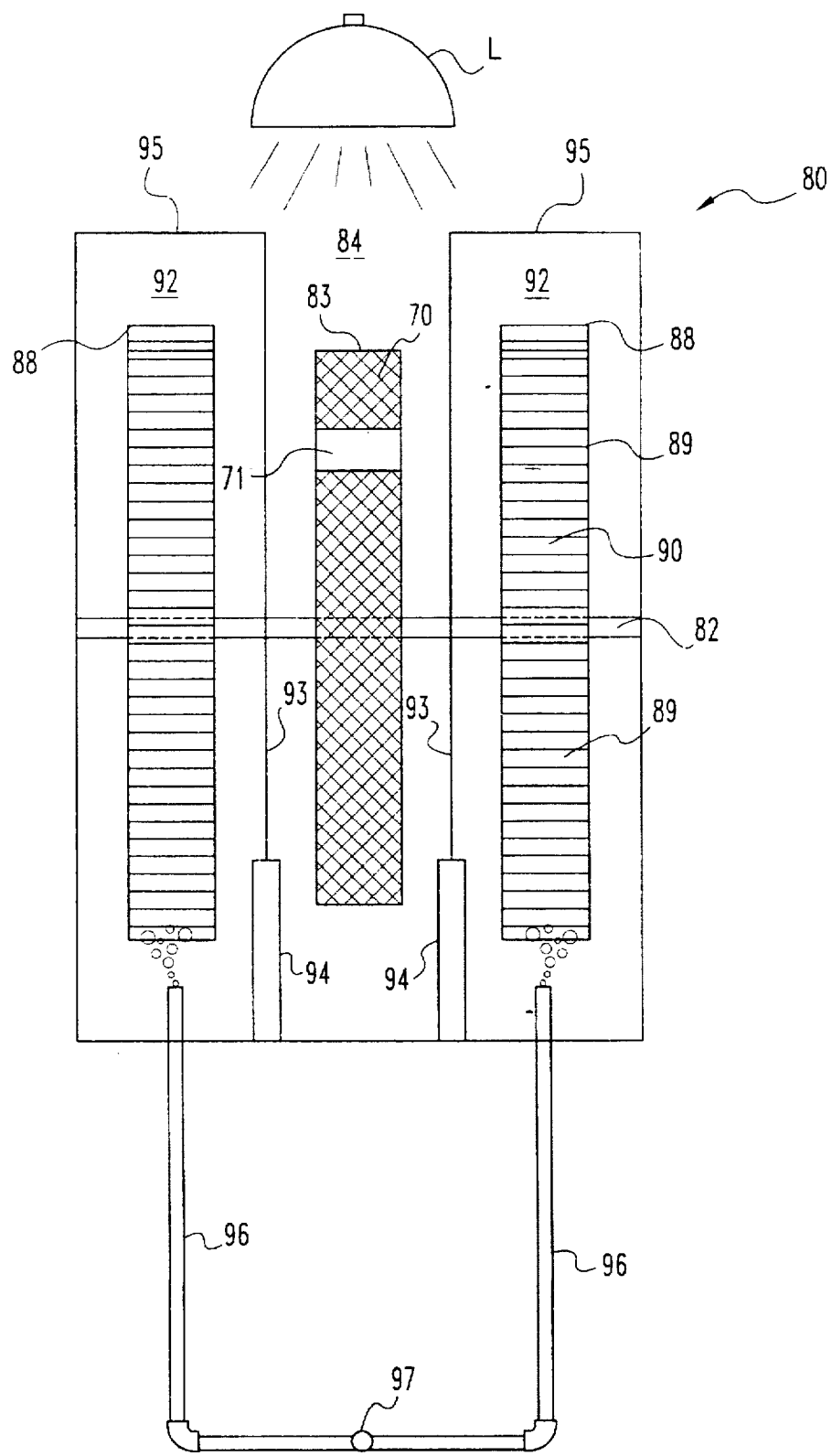
FIG. 5 is a front elevational view of the treatment unit depicted in FIG. 4.
Figure 6:
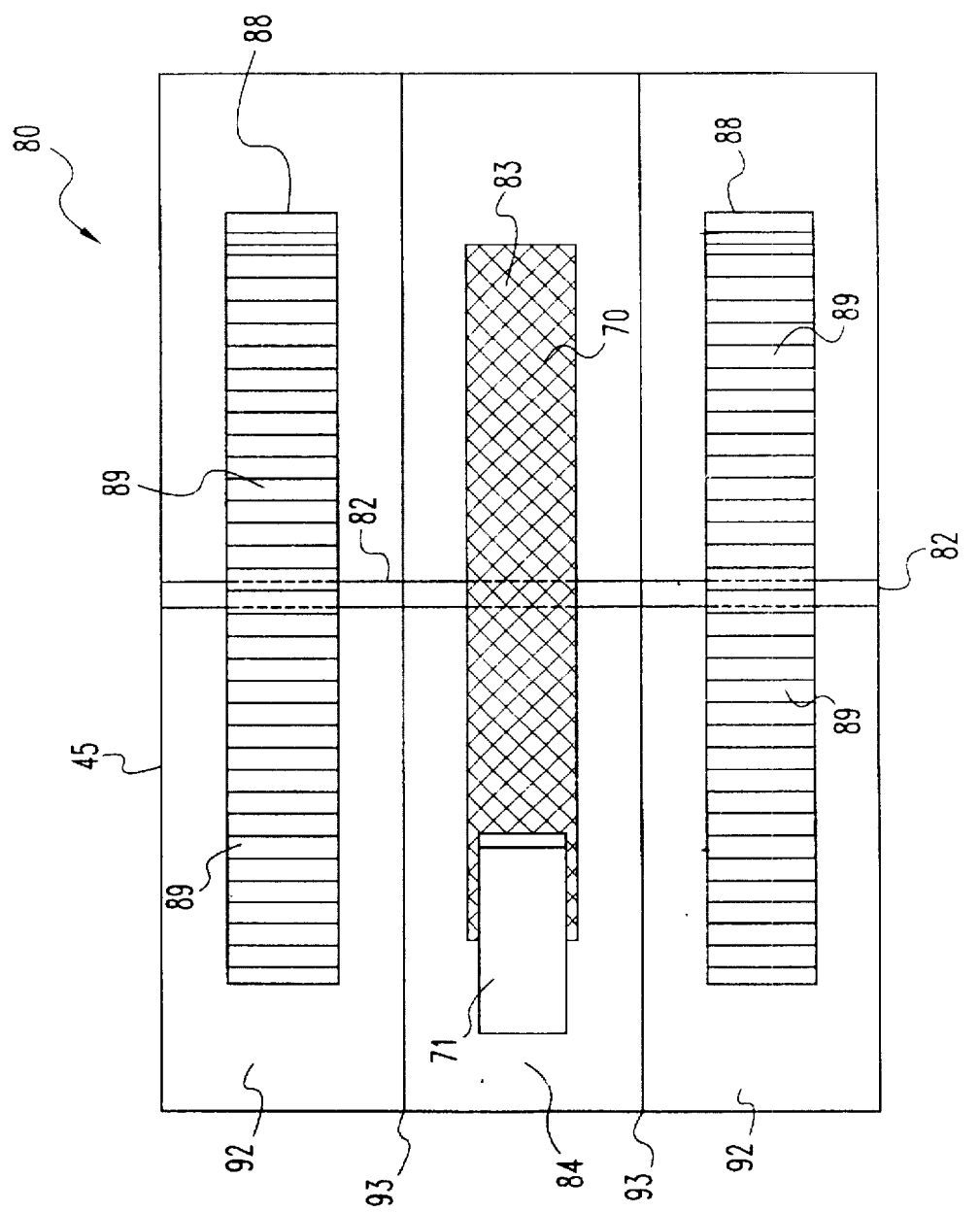
FIG. 6 is a top elevational view of the treatment unit of the treatment unit depicted in FIGS. 4 and 5.

In one preferred embodiment as depicted in FIGS. 4–6, the treatment unit 80 includes two or more separate wheels 81 joined by a common axle 52. The wheels 81 are preferably rigidly attached to the axle 82 so that they all turn in unison. The efficiency of the systems and devices of this invention to move water is dependent on the ratio of the volume of displacement media 50 to a volume of water 55 in the system. The greater amount of media 50, the greater amount of water displaced, i.e., the higher the water will rise in the tanks. Adding wheels 71 to the system increases the amount of displacement media 50 without increasing the size of the tank or the quantity of water. Thus, the water will rise higher in the tanks when the media 50 is submerged and will pump more water through the system. Preferably, one of the wheels is a biological wheel supporting bacterial and preferably also algal growth, while the remaining wheels are air capture wheels 88. As shown more clearly in FIGS. 5–6, the biological wheel 83 includes an algae screen 70 which supports the growth of algae as well as biological filter media. The algae scraper 71 harvests algae from the screen 70 into the harvested algae zone 71 as described above. The larger amount of media in this embodiment adds more surface area for bacterial growth.

One or more of the wheels 81 are preferably air capture wheels 88 as shown more clearly in FIGS. 5 and 6. Preferably, each of the air capture wheels 88 reside within an air capture zone 92 and the biological wheels 83 reside within a biological zone 84 as shown in FIGS. 5 and 6. The air capture zone 92 may be defined by divider walls 93 which preferably are supported by divider wall supports 94. The air capture zones can also be defined by light opaque covers 95. One advantage of this embodiment is that the air capture wheels 88 are not exposed to light. This prevents algal growth on the air capture wheels 88 and air capture members 99 which can reduce the amount of air that the air capture members 89 will capture and may possibly cause the treatment unit to clog up and stop. Therefore, this embodiment reduces the amount of maintenance required on the system. Embodiments which include more than one air capture wheel 88 will preferably include air tubes 96 for each air capture wheel 88 and air capture zone 92. In the embodiments shown in FIGS. 4 and 5, the air tubes 96 meet at a common joint 97.

Figure 7:
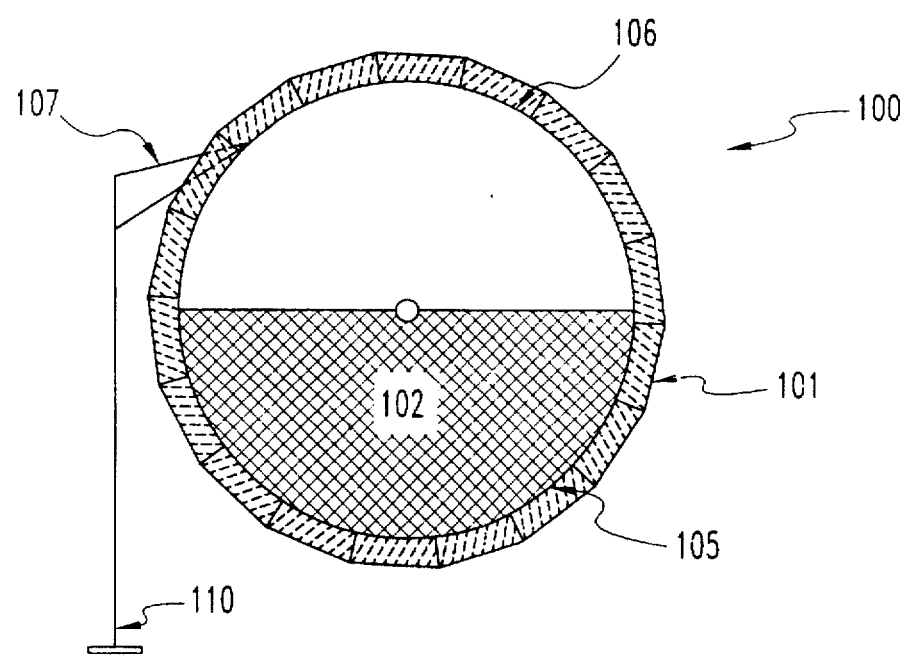
FIG. 7 is a side elevational view of a fluid treatment device according to this invention.

This invention also contemplates fluid treatment devices. One such device 100 is depicted in FIG. 7 and includes a rotatably supported wheel 101 carrying a biological filtration media 102 for supporting bacterial growth. The wheel 101 is at least partially filled with media 102. Media 102 is alternately submersible into and raisable out of fluid when the wheel 101 is rotated in the fluid 103. An algae screen 105 is attached to at least a portion of the wheel 101 for supporting algae growth. Preferably, the screen 105 is attached to the perimeter 106 of the wheel 101. Most preferably, the device includes an algae scraper 107 aligned to contact a portion of the screen 105 to continuously scrape algae from the screen 105 as the wheel 101 is rotated. As shown in FIG. 7, the scraper 107 is preferably supported by a support member 110.

The present invention combines algae treatment, biological filtration, water movement, wave creation and air supply in a single unit which can be installed with existing aquarium systems with only a minimum of modification. The devices of this invention provide complete water treatment for fresh and salt water aquariums and other fluid systems using both algal and biological processes.

Devices according to this invention provide advantages over existing algae scrubbers which pump water across the algae surfaces in that these novel devices move the algae surface through the water. The prior art horizontal algae scrubbers would have to be over three times the length of that of the present invention to have the same surface area provided by this invention.

The present invention also provides advantages over existing rotating biological contactors used in waste water systems which are completely filled with media. These rotating biological contactors require water to enter openings on the outside surface area for water movement across the media. Even though the contactors are open on their ends and submerged in water, the media is so tightly packed that water can only move radially through them and horizontally. Therefore, they cannot have air capture members covering the entire perimeter of the wheel. Since the present invention includes media wheels which are only partially filled with media, water is moved across the media as it is moved in and out of the water. Thus, the entire perimeter of the air capture wheels can be used for air capture members giving the device a greater rotating capacity.

The present invention also provides significant advantages over systems which require centrifugal water pumps because such pumps kill plankton populations which are necessary for filter feeding organisms. The present invention does not require water pumps so plankton populations can flourish creating a more natural environment. Prior art systems which require a pump and bucket device to move water across a stationary algae surface create a wave motion which causes splashing and salt build-up. The present invention however creates more laminar waves which prevents splashing and salt build-up.

The present invention further provides fluid treatment devices which provide the advantage that algae and bacteria are in close proximity to one another. This allows for more efficient and quicker gas exchange.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. For example, the present invention contemplates that the inlet and outlet reservoirs may be of any suitable configuration to deliver displaced water. Similarly, the treatment unit could be placed within an aquarium tank.

What is claimed:

1. A fluid treatment device for treating fluid in a first tank, comprising:

a wheel having an axis and a perimeter, rotatably supported in said first tank, and divided into two continuous portions, each of said portions extending from the axis to the perimeter;

a first of said portions being hollow to receive fluid when said first portion is rotated into fluid;

a second of said portions carrying a fluid displacement media, said media fixed within said second portion and displacing fluid when said second portion is rotated into fluid; and means for rotating said wheel to alternately displace a volume of fluid when said displacement media is submersed and allow the volume of fluid to fill said hollow portion when said displacement media is raised from the fluid to alternately change a level of fluid in the first tank.

2. The device of claim 1 wherein said displacement media is a biological filter media for supporting bacterial growth.

3. The device of claim 2 wherein said biological filter media supports aerobic bacterial growth.

4. The device of claim 1 further comprising:

a second tank having an inlet container and an outlet container disposed within said tank;

an outlet conduit fluidly communicating with said outlet container;

an inlet conduit fluidly communicating with said inlet container;

said inlet conduit and said outlet conduit fluidly communicating between said first tank and said second tank.

5. The device of claim 4 wherein said inlet container includes a wave wall positioned within said record tank, said wave wall defining means for creating a wave as fluid is displaced from said inlet container and flows over into the second tank when said displacement media is rotated.

6. The device of claim 1, further comprising a screen attached to a portion of said wheel for supporting algal growth.

7. The device of claim 6 wherein said screen is attached to said perimeter of said wheel.

8. The device of claim 7, further comprising:

a support member attached to a wall of the first tank; and an algae scraper supported by said support member, said algae scraper aligned to contact a portion of said screen to continuously scrape algae from said screen as said wheel is rotated.

9. The device of claim 1 wherein said means for rotating said wheel includes a plurality of air capture members operatively associated with said wheel, said members configured to capture air from an air pump.

10. The device of claim 9, further comprising:

an axle rigidly attached to said wheel; and an air capture wheel rigidly attached to said axle so that said wheel rotates when said air capture wheel rotates, said air capture wheel having a perimeter and said plurality of air capture members attached to said perimeter.

11. The device of claim 9, wherein said wheel has an outer perimeter and said plurality of air capture members are attached to said perimeter.

12. The device of claim 11, wherein said displacement media is a biological filter media for supporting aerobic bacterial growth.

13. A fluid treatment device for treating fluid in a tank, comprising:
- a wheel rotatably supported in the tank and having an axis and a perimeter, said wheel divided into two continuous portions, each of said portions extending from said axis to said perimeter;
- a first of said portions being hollow to receive fluid when said first portion is rotated into fluid;
- a second of said portions carrying a fluid displacement media, said media fixed within said second portion and displacing fluid when said displacement portion is rotated into fluid; and
- air capture means for rotating said wheel to alternately displace a volume of fluid when said displacement media is submersed and allow the volume of fluid, to fill said hollow portion when said displacement media is raised from the fluid to alternately change a level of fluid in the tank, solely by capturing air from an air pump.

14. The device of claim 13 wherein said displacement media is a biological filter media for supporting bacterial growth.

15. The device of claim 13 wherein said means includes a plurality of air capture members attached to said perimeter.

16. A fluid treatment device for treating fluid within a tank, comprising:
- a wheel supported supportable in the tank and having an axis and a perimeter, said wheel including means for alternately changing the level of fluid in the tank, said wheel divided into two continuous wheel portions, said means including said two continuous wheel portions, each of said portions extending from said axis to said perimeter, a first of said portions being hollow, and a second of said portions carrying a volume of displacement media, said displacement media being fixed within said second portion so that said media in said second portion is alternately submersible into and raisable out of fluid contained in said tank as said wheel is rotated.

17. The device of claim 16 wherein said displacement media is a biological filter media for supporting bacterial growth.

* * * * *

UNITED STATES PATENT AND TRADEMARK OFFICE
CERTIFICATE OF CORRECTION

PATENT NO. : 5,755,961
DATED : May 26, 1998
INVENTOR(S) : Christopher A. Limcaco It is certified that error appears in the above-identified patent and that said Letters Patent is hereby corrected as shown below:

On the cover, in the title, please change "AQUARIUM SYSTEM" to --FLUID TREATMENT DEVICE--.

In column 8, line 41, please change "said record tank," to -- said second tank,--.

In column 10, line 8, please change "supported supportable" to --rotatably supported--.

Signed and Sealed this

Twenty-seventh Day of October, 1998

Attest:

BRUCE LEHMAN

*Attesting Officer*  *Commissioner of Patents and Trademarks*